US008883319B2

(12) United States Patent
Freti et al.

(10) Patent No.: US 8,883,319 B2
(45) Date of Patent: Nov. 11, 2014

(54) COATING BLADE

(75) Inventors: Silvano Freti, St. Prex (CH); Jean Francois Laithier, Coffrane (CH)

(73) Assignee: BTG Eclepens S.A., Eclepens (CH)

( * ) Notice: Subject to any disclaimer, the term of this patent is extended or adjusted under 35 U.S.C. 154(b) by 1416 days.

(21) Appl. No.: 11/922,488

(22) PCT Filed: Jun. 29, 2006

(86) PCT No.: PCT/EP2006/006299
§ 371 (c)(1), (2), (4) Date: Mar. 25, 2008

(87) PCT Pub. No.: WO2007/003332
PCT Pub. Date: Jan. 11, 2007

(65) Prior Publication Data

US 2009/0053423 A1 Feb. 26, 2009

(30) Foreign Application Priority Data

Jul. 1, 2005 (SE) ....................................... 0501526

(51) Int. Cl.
*B32B 9/00* (2006.01)
*B32B 15/00* (2006.01)
*C23C 30/00* (2006.01)
*B05C 11/04* (2006.01)

(52) U.S. Cl.
CPC ............. *B05C 11/045* (2013.01); *C23C 30/005* (2013.01); *B05C 11/04* (2013.01)
USPC ........... 428/689; 428/457; 428/698; 428/699; 15/256.51; 101/157; 118/200; 162/281

(58) Field of Classification Search
USPC ........ 15/256.51; 101/157; 118/200; 162/281; 428/457, 689, 698, 699
See application file for complete search history.

(56) References Cited

U.S. PATENT DOCUMENTS

| | | | | |
|---|---|---|---|---|
| 3,703,019 A * | 11/1972 | Bratt | ........................ | 15/256.51 |
| 4,720,437 A * | 1/1988 | Chudo et al. | .................. | 428/698 |
| 5,085,171 A * | 2/1992 | Aulick et al. | ................. | 399/284 |
| 5,727,468 A | 3/1998 | Blackwell et al. | | |
| 5,824,154 A | 10/1998 | Freti et al. | | |
| 5,863,329 A | 1/1999 | Yamanouchi et al. | | |

(Continued)

FOREIGN PATENT DOCUMENTS

| | | | | |
|---|---|---|---|---|
| EP | WO-2005-023533 * | 3/2005 | ................ | B31F 1/14 |
| GB | 2130924 A | 6/1984 | | |

(Continued)

OTHER PUBLICATIONS

Machine English translation of JP 07-301938 to Yamamoto, retrieved from the JPO website on Dec. 3, 2011.*

*Primary Examiner* — Jonathan Langman
(74) *Attorney, Agent, or Firm* — Buchanan Ingersoll & Rooney P.C.

(57) ABSTRACT

Improved coating blades are disclosed, as well as processes for manufacturing such blades. The inventive blades have an intermediate edge deposit effective to reduce heat transfer from a wear resistant top deposit to the blade substrate. In one embodiment, the intermediate layer is comprised of NiCr, possibly with embedded oxide particles. Suitably, the intermediate layer and the top deposit are applied by an HVOF process. It is also envisaged that the intermediate layer may be deposited by plasma spraying. The intermediate layer may comprise stabilized zirconia.

15 Claims, 3 Drawing Sheets

(56) References Cited

U.S. PATENT DOCUMENTS

| | | | | |
|---|---|---|---|---|
| 6,207,021 | B1 * | 3/2001 | Eriksson et al. | 162/281 |
| 6,756,111 | B1 * | 6/2004 | Okada et al. | 428/216 |
| 7,133,428 | B2 * | 11/2006 | Kitaoka et al. | 372/38.02 |
| 2005/0089706 | A1 * | 4/2005 | Urata et al. | 428/546 |
| 2007/0187089 | A1 * | 8/2007 | Bridges | 166/248 |

FOREIGN PATENT DOCUMENTS

| | | | | |
|---|---|---|---|---|
| GB | 2295400 | A | 5/1996 | |
| JP | 07-301938 | * | 11/1995 | G03G 7/00 |
| WO | WO98/26877 | A1 | 6/1998 | |

* cited by examiner

COATING BLADE

TECHNICAL FIELD

The present invention relates to layered coating blades, and in particular to coating blades having a wear resistant top deposit comprising a metal, a carbide, a cermet or a combination thereof.

BACKGROUND

High performance coating blades are often used for applying a thin layer of coating color onto a traveling paper web. The influence of the paper fibers together with the high mineral content of pigments in the coating color and the high speed of modern blade coating installations, result in a situation where the blade tip is subjected to intense wear during use.

One of the first documents describing the use of ceramic tipped blades in order to increase the working life of coating blades, and thereby improve productivity in the coating process, is GB 2 130 924.

Document WO 98/26877 describes the use of a blade provided with a soft elastomer tip in order to provide a high performance coating blade having specific benefits relating to improvement of fiber coverage.

Quite recently, another class of coating blades has been developed and introduced to the market. These are blades for which the wear resistant working edge comprises a metallic or carbide deposit (carbides with a metallic matrix acting as a binder), or a cermet deposit. Such blades have mainly been produced by thermal spraying, with subsequent grinding to obtain the desired geometrical edge properties. Such deposit offers a range of advantages in blade coating compared to the traditional blades comprising a ceramic deposit, oxide blends and the like. One advantage is that such blades provide a far superior wear resistance compared to ceramic tipped blades, with the benefit of increasing even further the productivity in the coating station. Further, a drawback of ceramic blades has always been the inherent brittleness, leading to possible flaws or chips at the working edge of the blades. Such flaws or chips may occur during manufacture of the blade, during handling of the blade, or even during use of the blade in coating operations. The result of chips or other flaws at the working edge may be linear defects in the coated product, called streaks, or may even lead to web breaks and loss of material. The high toughness of metal and carbide based materials leads to lower sensitivity to edge cracking and therefore provides important advantages both during manufacture and handling, as well as during use of the blade. Yet another advantage of blades of this kind compared to ceramic blades is that they are less susceptible to edge wear occurring at the coating color limit adjacent to the longitudinal edges of the paper web. In addition, metallic or carbide materials are well suited for deposition by HVOF (High Velocity Oxy Fuel) spraying. In HVOF, the material is sprayed onto a substrate at a higher kinetic energy compared to plasma spraying (this latter using higher thermal energy). Therefore, very dense deposits may be formed (having lower than 2% porosity), enhancing the mechanical properties and reducing the risk of foreign particles getting trapped in the porosities.

Thus, there are many advantages motivating the use of metallic, carbide or cermet based coating blades for improving the productivity in the paper mill and also for raising the quality of the produced product.

SUMMARY

However, it has been found that coating blades having a metallic or carbide based edge deposit, or a cermet edge deposit, suffer from the important drawback that the deposit has a very high thermal conductivity. This may lead to a number of practical limitations, as explained below.

When the blade is loaded against the traveling web (i.e. when the blade holder is closed), the contact between the blade and the web will be without any coating color during some initial period of time (typically several seconds). During this time, dry friction occurs that may lead to a local generation of large amounts of heat. The blade tip, comprising metallic or carbide, typically withstands the induced temperature without loosing any wear resistance properties. However, the heat generated will rapidly be transferred to the steel strip substrate of the blade. The blade is typically firmly clamped in the blade holder, so the heated edge section of the blade is not free to expand due to the rise of temperature. As a consequence, the blade starts to become wavy at the working edge. This may not be easily seen while the blade is loaded against the web, but if the blade holder is opened after a certain amount of dry friction, keeping the clamping closed, it can be seen that the blade edge has assumed a “snake-like” wavy form. After the initial dry friction has ended (due to arrival of coating color at the blade edge), temperature will drop and some of this waving will decrease. However, some waving of the blade edge will typically remain, and the blade is said to be “burnt” and not usable anymore for proper coating operation. Use of a “burnt” and wavy coating blade would lead to successive regions of low and high coat weights due to the varying linear load caused by the wavy edge. From a quality standpoint, this is of course not acceptable.

The above-described heating and waving problem generally prevents metallic or carbide based blade from being used in high-speed on-line coating machines, in which the blade is loaded against the web at full speed. Similar problems may occur if for some reason the color feed is suddenly interrupted. Dry friction may also occur following web breaks if the blade holder is not immediately opened after stopping the flow of coating color.

This kind of overheating and ensuing waviness of the blade edge leads to premature blade changes, such that the full potential lifetime of the blade is far from being reached. Consequently, there is an industrial interest in providing a new, cost-effective solution to the limitations of metallic and carbide based blades described above.

It is here proposed a solution which avoids these limitations of metallic and carbide based blades, while keeping all other intrinsic advantages. It will be readily understood that the teachings of this description may be applied also for other types of coating blades having a top deposit of comparatively high thermal conductivity.

Generally, it is proposed to have an intermediate layer between the blade substrate and the wear resistant top deposit, wherein said intermediate layer acts as a thermal barrier for reducing heat transfer to the steel substrate. It is recommended to replace some of the traditional deposit thickness by the thermal barrier layer, such that the total thickness for the edge deposit remains substantially the same as for prior art blades (without the inventive thermal barrier). As an example, the thermal barrier thickness could be about one third of the top deposit thickness.

In general, the intermediate layer should have a lower thermal conductivity than the wear resistant top deposit. Preferably, the intermediate layer has a thermal conductivity below 0.5 times that of the top deposit, more preferably below 0.2 times that of the top deposit.

The intermediate thermal barrier layer preferably has a thermal conductivity below approximately 40 W/(m·K), more preferably below 15 W/(m·K). The thermal barrier preferably has a width equal to or larger than the width of the wear resistant deposit, such as 3-20 mm, more preferably 1-10 mm. The thermal barrier preferably has a thickness in the range from about 10 to about 100 μm, more preferably 20 to 80 μm.

Suitable materials for the intermediate thermal barrier layer include oxides and oxide blends; ceramic materials; ceramic materials infiltrated with a polymer binder; a mixture of a ceramic material with an amount of metallic binder; zirconia, titania or a mixture thereof; a polymer material; and a polymer material containing ceramic fillers.

The intermediate layer may comprise stabilized zirconia together with a bond coat on both the substrate side and the top deposit side to ensure mechanical integrity of the layered structure.

Alternatively, the intermediate thermal barrier may comprise titanium oxide ($TiO_2$), possibly in a mixture with chromium.

The teachings of this description can be applied for any type of coating blade having a wear resistant top deposit of comparatively high thermal conductivity, for which heat transfer to an underlying substrate is to be reduced.

Suitable materials for the wear resistant top deposit for use in a blade according to the present invention include Ni and Co alloys or mixtures thereof; WC/Co, WC/CoCr or WC/Ni materials; CrC/NiCr materials; a mixture of WC and CrC in a metallic binder; a chromium plating; and chemically deposited NiP or NiB. In general, the wear resistant top deposit may be a metallic, carbide or cermet based deposit, or a deposit containing a mixture thereof.

As known in the art of materials science, a cermet is a material containing ceramics and metal. WC/Co and WC/Ni are examples of cermets.

The thickness of the wear resistant deposit is preferably in the range from about 30 to about 300 μm, more preferably 30 to 150 μm.

The intermediate layer (the thermal barrier) is preferably deposited by plasma spraying or HVOF. The top layer is preferably sprayed by HVOF.

BRIEF DESCRIPTION OF THE DRAWINGS

The detailed description given below makes reference to the accompanying drawings, on which.

In the drawings, like parts are designated by like reference numerals throughout.

DETAILED DESCRIPTION

Coating blades using ceramic oxide like Alumina or Chromia applied by plasma spraying are not suffering from the waving effect mentioned above in case of dry friction. This is readily understood in view of their relative low thermal conductivity; K values for bulk Alumina as reported in the literature are about 20-35 W/mK within the 20-200° C. range. The real values for thermal sprayed layers may give substantially lower values because of the inherent porosity of the resulting deposit.

On the other side WC/Co/Cr materials, applied by HVOF, result in a deposit with a rather high thermal conductivity. K values in the literature for bulk-cemented carbide are in the range of 60-80 W/mK. The HVOF deposit is assumed to be very close to this range since almost no porosity is present.

Figure 1A:
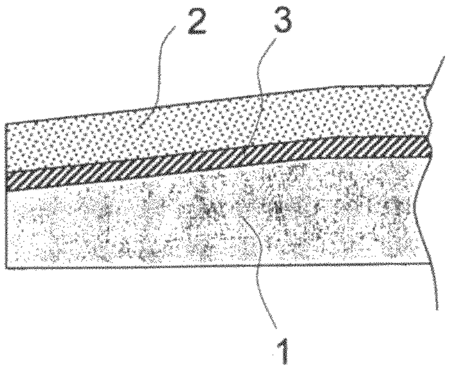
FIG. 1*a* is a schematic sectional drawing of a blade according to the present invention, intended for use in bent mode.
Figure 1B:
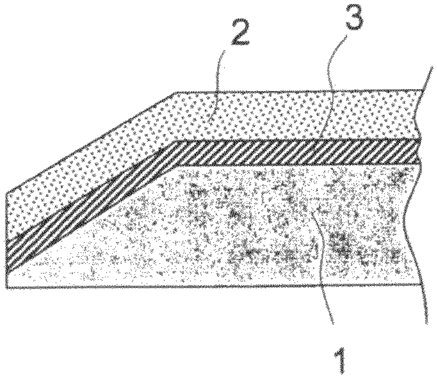
FIG. 1*b* is a schematic sectional drawing of a blade according to the present invention, intended for use in stiff mode.

FIGS. 1*a* and 1*b* schematically show blades according to the present invention for use in bent mode (FIG. 1*a*) and stiff mode (FIG. 1*b*), respectively. In general, the blades comprise a steel substrate 1 and a wear resistant top deposit 2 made e.g. from metal carbide or cermet base material. Between the top deposit 2 and the steel substrate 1, there is provided an intermediate layer 3 having a lower thermal conductivity than the top deposit. The function of the intermediate layer is to reduce conduction of heat from the top deposit 2 to the blade substrate 1, and thereby reduce thermal expansion and "waving" of the blade.

Figure 2:
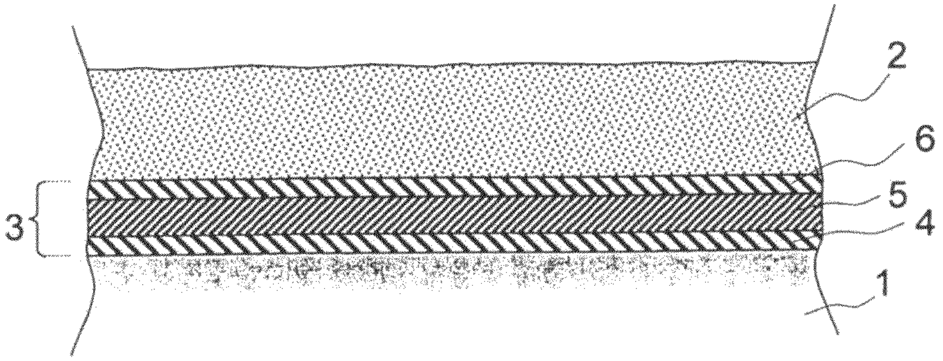
FIG. 2 is a schematic drawing showing the detailed construction of the various layers for an improved coating blade according to the present invention.

FIG. 2 shows in greater detail a blade according to the present invention, wherein the intermediate layer is shown to comprise also bond coats adjacent the top deposit and the blade substrate. Hence, the intermediate layer 3 is, in the example shown in FIG. 2, comprised of a center layer 5 and an inner and outer bond coat 4 and 6.

Figure 3:
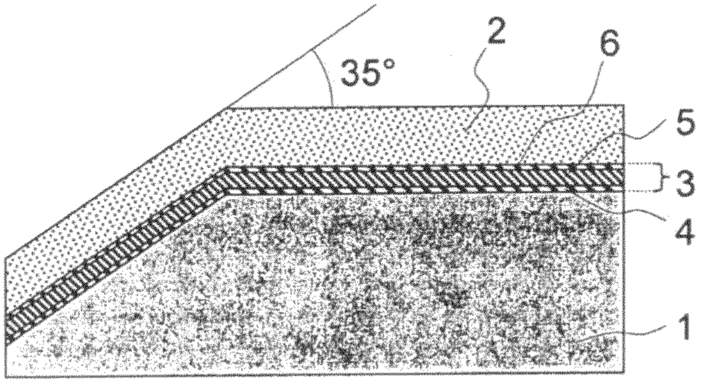
FIG. 3 is a schematic transversal sectional drawing showing the improved coating blade according to the present invention.

FIG. 3 shows how the various layers of the blade are arranged in cross-section. In this example, the front bevel has an angle of 35 degrees, but it should be understood that other front bevels are conceivable depending on the intended application.

With a view to limit the amount of heat transferred to the steel substrate of the blade, therefore limiting the steel thermal expansion, the following experiments were undertaken.

EXPERIMENT 1

This experiment relates to the preparation of an improved coating blade using an oxide based ceramic intermediate layer. As schematically shown in FIG. 2, the intermediate layer 3 is sprayed by plasma spraying and comprises a layer of stabilized zirconia and two thin layers of bond coat on each side of the zirconia layer.

The blade is prepared by undertaking the following steps:

1. The coater blade steel substrate of 0.381 mm thickness and 100 mm width is first pre-bevelled with a 35 degrees grinding at one edge.
2. Then, the ground edge section of the substrate is "sand blasted" over a 5 mm width, using F100 corundum.
3. A masking tape, a steel masking system or some other equivalent masking means is provided along the blade length to restrict subsequent deposition to the 5 mm width.
4. A 10 microns thick layer of NiCr(80/20), reference 4 in FIG. 2, is applied by plasma spraying. Amperit 251.693 from HC. Starck is a typical suitable product.
5. A 30 microns thick layer of stabilized Zirconia, reference 5 in FIG. 2, is applied by plasma spraying. SM 6600 from Sulzer Metco is a typical suitable product.
6. A 10 microns thick layer of NiCr(80/20), reference 6 in FIG. 2, is applied by plasma spraying. Amperit 251.693 from HC. Starck is a typical suitable product.
7. A 100 microns(after finishing) top wear resistant deposit of WCCoCr (86/10/4 in weight %) is applied by HVOF spraying. Diamalloy 5844 from Sulzer Metco is a typical suitable product.

The table 1 hereafter is giving the spraying parameters used for preparing a blade according to this experiment.

TABLE 1

| | | | Intermediate layer | | | Top deposit |
|---|---|---|---|---|---|---|
| | | | Layer 4 | Layer 5 | Layer 6 | Layer 2 |
| | Material | | NiCr 80/20 | $ZrO_2$—$8Y_2O_3$ | NiCr 80/20 | WC/CoCr 86/10/4 |
| | Trade name | | Amperit 251.693 | SM 6600 | Amperit 251.693 | Diamaloy 5844 |
| | Thickness | (μm) | 10 | 30 | 10 | 100 |
| | Trav. Speed | ($m \cdot min^{-1}$) | 150 | 150 | 150 | 150 |
| AP S | Gun | | F4 Sulzer Metco | F4 Sulzer Metco | F4 Sulzer Metco | |
| | Ar | (SLPM) | 43 | 35 | 43 | |
| | $H_2$ | (SLPM) | 9.5 | 12 | 9.5 | |
| | Intensity | (A) | 500 | 600 | 500 | |
| | Voltage | (V) | 72 | 70 | 72 | |
| | Carrier gas | (SLPM) | 3.5 | 2.5 | 3.5 | |
| | Powder feed rate | ($g \cdot min^{-1}$) | 45 | 35 | 45 | |
| | Spray distance | (mm) | 120 | 120 | 120 | |
| HVOF | Gun | | | | | Diamond jet 2600 |
| | Nat Gas | (SLPM) | | | | 189 |
| | $O_2$ | (SLPM) | | | | 278 |
| | Air | (SLPM) | | | | 360 |
| | Feed gas | (SLPM) | | | | 12.5 |
| | Powder feed rate | ($g \cdot min^{-1}$) | | | | 60 |
| | Spr. Distance | (mm) | | | | 230 |

The front and top surfaces are subsequently ground to achieve the required geometry as represented in FIG. 3.

Comparing this blade with a state of the art carbide tip blade, made with about 150 microns (after finishing) of Diamalloy 5844 wear resistant top deposit, the blade according to this experiment replace 50 microns of highly thermally conductive material by an intermediate layer acting as a thermal barrier.

EXPERIMENT 2

This experiment relates to the preparation of an intermediate layer based on ceramic oxide and applied by HVOF. The chosen material is $TiO_2$, being a cheap, low thermal conductivity oxide and above all being an oxide having one of the lowest melting points (2090 deg C.).

The blade is prepared by undertaking the following steps:

1. The coater blade steel substrate of 0.381 mm thickness and 100 mm width is first pre bevelled with a 35 deg grinding at one edge.
2. Then, the ground edge is "sand blasted" on 5 mm width, with F100 corundum.
3. A masking tape, a steel masking system or some other equivalent masking means is provided along the blade length to restrict subsequent deposition to the 5 mm width.
4. It was attempted to spray a 50 microns layer of TiO2 (Ampérit 782.054 from HCStarck) with the parameters reported in table 2 but without success. No layer was constructed, confirming that this HVOF process is not suitable to melt $TiO_2$ particles.

TABLE 2

| | | | Intermediate layer 3 |
|---|---|---|---|
| | Material | | $TiO_2$ |
| | Trade name | | Ampérit 782.054 |
| | Thickness | (μm) | 50 |
| | Trav. Speed | ($m \cdot min^{-1}$) | 150 |
| HVOF | Gun | | Diamond jet 2600 |
| | Nat Gas | (SLPM) | 220 |
| | $O_2$ | (SLPM) | 380 |
| | Air | (SLPM) | 200 |
| | Feed gas | (SLPM) | 8 |
| | Powder feed rate | ($g \cdot min^{-1}$) | 20 |
| | Spr. Distance | (mm) | 230 |

Hence, experiment 2 shows that it may not be a suitable approach to use HVOF for applying a deposit comprised of $TiO_2$. In other words, $TiO_2$ seems not to be sprayable by HVOF. Following this unsuccessful experiment, it was decided to conduct further experiments in order to find a suitable manner of producing improved coating blades in an HVOF process.

To this end, experiment 3 was directed to the task of finding a metallic matrix sprayable by HVOF, which could have the ability to entrap oxide particles, as the attempt to spray pure $TiO_2$ by HVOF was unsuccessful. Hence, although oxide particles like $TiO_2$ are difficult or even impossible to spray by HVOF, it was envisaged that such oxide particles could be deposited if they were entrapped in a metallic matrix, wherein the metallic matrix itself is well suited for HVOF deposition.

Finally, in experiment 4, an intermediate layer made of ceramic metal composite, sprayable by HVOF, was prepared. In this experiment, oxide material was deposited as entrapped particles in a metal matrix.

EXPERIMENT 3

This experiment relates to the preparation of an improved coating blade using a metallic based intermediate layer. The intermediate layer 3 is made of Ni/Cr (80/20). In this case, both the intermediate layer and the wear resistant top deposit are applied by HVOF.

The blade is prepared by undertaking the following steps:

1. The coater blade steel substrate of 0.381 mm thickness and 100 mm width is first pre bevelled with a 35 deg grinding at one edge.
2. Then the ground edge is "sand blasted" on 5 mm width, with F100 corundum.
3. A masking tape, a steel masking system or some other equivalent masking means is provided along the blade length to restrict subsequent deposition to the 5 mm width.

4. A 50 microns layer of NiCr(80/20), reference 3 in FIG. 2, is applied by HVOF spraying. Ampérit 251.090 from HCStarck is a typical suitable product.
5. A 100 microns(after finishing) top wear resistant deposit of WC/Co/Cr (86/10/4 in weight %) is applied by HVOF spraying. Diamalloy 5844 from Sulzer Metco is a typical suitable product.

The table 3 hereinafter is giving the spraying parameters used for preparing a blade according to this experiment 3.

TABLE 3

| | | | Intermediate layer 3 | Top Deposit |
|---|---|---|---|---|
| | Material | | NiCr 80/20 | WC/CoCr 86/10/4 |
| | Trade name | | Amperit 251.090 | Diamalloy 5844 |
| | Thickness | (μm) | 50 | 100 |
| | Trav. Speed | $(m \cdot min^{-1})$ | 150 | 150 |
| HVOF | Gun | | Diamond jet 2600 | Diamond jet 2600 |
| | Nat Gas | (SLPM) | 200 | 189 |
| | $O_2$ | (SLPM) | 350 | 278 |
| | Air | (SLPM) | 300 | 360 |
| | Feed gas | (SLPM) | 15 | 12.5 |
| | Powder feed rate | $(g \cdot min^{-1})$ | 20 | 60 |
| | Spr. Distance | (mm) | 230 | 230 |

EXPERIMENT 4

This experiment relates to the preparation of an improved coating blade using a ceramic/metal composite intermediate layer. In this case, both the intermediate layer and the wear resistant top deposit are applied by HVOF.

The blade is prepared by undertaking the following steps:

1. The coater blade steel substrate of 0.381 mm thickness and 100 mm width is first pre bevelled with a 35 deg grinding at one edge.
2. Then the ground edge is "sand blasted" on 5 mm width, with F100 corundum.
3. A masking tape, a steel masking system or some other equivalent masking means is provided along the blade length to restrict subsequent deposition to the 5 mm width.
4. A 50 microns layer of a blend of 2/3 NiCr(80/20) (Amdry 4532 from SulzerMetco) and 1/3 $TiO_2$ (Ampérit 782.084) by weight is applied by HVOF spraying.
5. A 100 microns(after finishing) top wear resistant deposit of WC/Co/Cr (86/10/4 in weight %) is applied by HVOF spraying. Diamalloy 5844 from Sulzer Metco is a typical suitable product.

The table 4 hereafter is giving the spraying parameters used for preparing a blade according to this experiment 4.

TABLE 4

| | | | Intermediate layer 3 | Top Deposit |
|---|---|---|---|---|
| | Material | | ⅔ NiCr(80/20) ⅓ $TiO_2$ | WC/CoCr 86/10/4 |
| | Trade name | | Amdry 4532/ Ampérit 782.054 | Diamalloy 5844 |
| | Thickness | (μm) | 50 | 100 |
| | Trav. Speed | $(m \cdot min^{-1})$ | 150 | 150 |
| HVOF | Gun | | Diamond jet 2600 | Diamond jet 2600 |
| | Nat Gas | (SLPM) | 210 | 189 |
| | $O_2$ | (SLPM) | 380 | 278 |

TABLE 4-continued

| | | Intermediate layer 3 | Top Deposit |
|---|---|---|---|
| Air | (SLPM) | 250 | 360 |
| Feed gas | (SLPM) | 12 | 12.5 |
| Powder feed rate | $(g \cdot min^{-1})$ | 25 | 60 |
| Spr. Distance | (mm) | 190 | 230 |

An investigation by SEM cross-section analysis of the so sprayed intermediate layer was performed. Surprisingly, the EDX semi quantitative analysis gave an amount of $TiO_2$ in the intermediate layer in the same level as the one of the blended initial feedstock.

| | |
|---|---|
| Initial blended powder: | $TiO_2$ 33% NiCr 67% |
| Intermediate layer as measured by EDX: | $TiO_2$ 30% NiCr 70% |

Thus, it was not expected to obtain such an "almost perfect" degree of entrapment of $TiO_2$ within the metallic matrix. Such a specific intermediate layer is expected to act favourably with respect to the thermal barrier scope.

Dry Friction Lab Tests

In order to evaluate the potential of the different intermediate layers prepared according to the previous experiments, a dry friction test was developed, which includes the following:

- For simulating the backing roll in blade coating, a 150 mm diameter and 80 mm wide rubber coated roll is used, which rotates at preset speed through a motor drive system with close loop speed control,
- On the roll a sheet of paper is applied onto the rubber based material and is changed after each test; the paper used is coated paper (100 $g.m^{-2}$) and the friction test is performed against the smooth face thereof,
- A blade holder of ABC type (BTG UMV/Sweden) is used, including a pneumatic loading system to apply the tipped edge of a 100 mm length blade sample against the paper, in dry conditions.
- A highly reactive thermocouple applied onto the back of each blade in the middle of the blade width is used for determining temperature rise in the blade,
- A data acquisition system is used for enabling to acquire, store and display the response of the thermocouple as well as the motor load over the time of the dry friction test.

Practical Conditions were as Follows:

| | | |
|---|---|---|
| Motor drive frequency: | 17.5 | Hz |
| Actuator pressure: | 1.6/1.0 | bar |
| Test duration: | 20 | sec |

Figure 4:
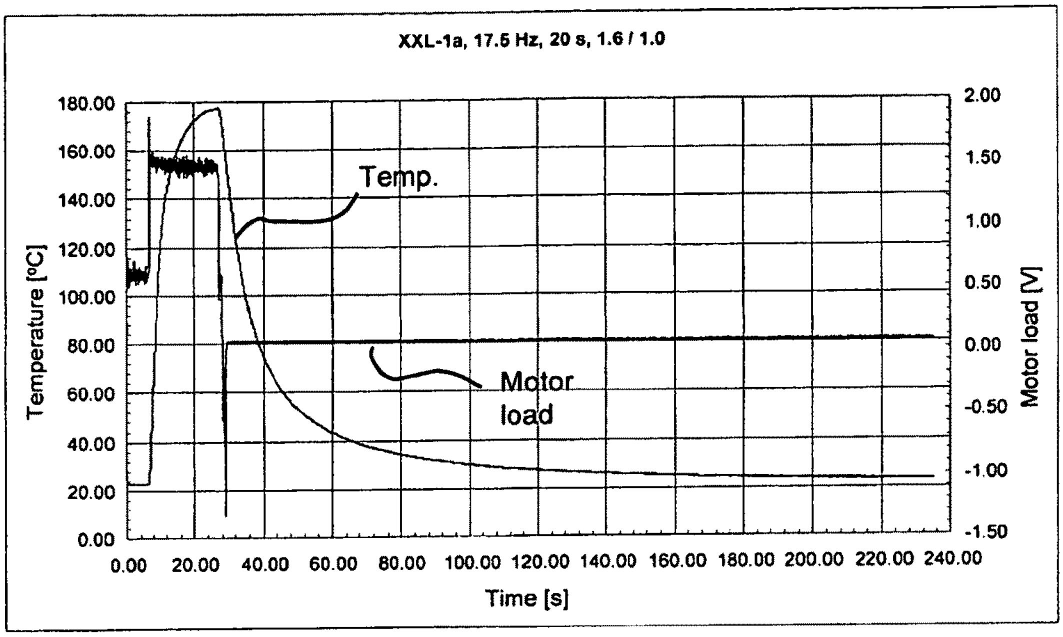
FIG. 4 is a graph illustrating comparative dry friction test measurements.

Each blade sample was tested twice; a first test to fit the contact against the fresh paper over the entire width and a second test to measure temperature rise and blade load. FIG. 4 is a typical example of the outcome of such a test, obtained for a state of the art blade without any intermediate layer. It can be seen that the temperature of the opposite side of the steel blade substrate can reach about 176° C. after just 20 seconds of dry friction. Assuming a thermal linear expansion coefficient of $12\times10^{-6}$/° C., the thermal expansion of the tip of a 1 m blade in such conditions is given by:

$$\text{Increase in length} = 1 \text{ m length} \times 12 \times 10^{-6}/° \text{ C.} \times (176-20)\ ° \text{ C.}$$
$$= 1.85 \text{ mm}$$

The results are reported in the table 5 hereafter, where results obtained for a state of the art WCCoCr blade are compared to results obtained for blades according to experiments 1, 3 and 4 as described herein. For further comparison, results are also presented relating to prior art ceramic blades.

TABLE 5

| Experiment | Top layer Thick. (μm) | Intermediate layer Type | Intermediate layer Thick. (μm) | Total Thick. (μm) | Peak Temp. (° C.) | ΔT (° C.) | dl (mm · m$^{-1}$) | Motor load (V) |
|---|---|---|---|---|---|---|---|---|
| State of the art WCCoCr | 140 | None (reference) | — | 140 | 176 | 154 | 1.85 | 1.5 |
| 1 | 105 | $NiCr/ZrO_2/NiCr$ | 45 | 150 | 124 | 104 | 1.25 | 1.4 |
| 3 | 96 | NiCr | 35 | 151 | 145 | 123 | 1.47 | 1.3 |
| 4 | 95 | $(NiCr + TiO_2)$ blend | 33 | 128 | 143 | 121 | 1.45 | 1.35 |
| State of the art $Cr_2O_3/TiO_2$ (85/15) | 140 | none | — | 140 | 106 | 84 | 1.00 | 1.2 |
| State of the art $Al_2O_3/TiO_2$ (97/3) | 140 | none | — | 140 | 89 | 67 | 0.80 | 1.3 |

As expected, a blade according to the experiment 1 above shows a much lower tip temperature reached after 20 seconds of dry friction compared to the prior art reference WC/Co/Cr. Experiment 4 was a surprise, as far as the degree of embedment of Titania particles is concerned, and gave a substantial reduction in the peak temperature and the ensuing thermal expansion. Even more surprising is the fact that experiment 3, using only the corresponding matrix of the experiment 4, is giving very interesting result as well. This was totally unexpected as NiCr is not considered as a material for thermal barrier in the thermal spraying community. By combining two well known spraying materials in an innovative way, an improvement of the thermal properties of the blade was obtained, which can dramatically reduce the limitations described above, while keeping the simplicity of using one single process for the manufacturing.

Conclusion

Improved coating blades have been disclosed, as well as processes for manufacturing such blades. The inventive blades have an intermediate edge deposit effective to reduce heat transfer from a wear resistant top deposit to the blade substrate. In one embodiment, the intermediate layer is comprised of NiCr, possibly with embedded oxide particles. Suitably, the intermediate layer and the top deposit are applied by an HVOF process. It is also envisaged that the intermediate layer may be deposited by plasma spraying. The intermediate layer may comprise stabilized zirconia.

The invention claimed is:

1. A coating blade comprising:

a substrate in the form of a metallic strip; and a wear resistant top deposit covering a working edge of the blade intended for contact with a moving paper web, the top deposit forming a ground edge;

wherein the wear resistant top deposit comprises a metallic material, a carbide with a metallic matrix, or a cermet;

wherein there is an intermediate layer between the substrate and the top deposit, said intermediate layer having a lower thermal conductivity than said top deposit; and wherein the wear resistant top deposit has a thickness within the range from 30 μm to 150 μm;

wherein the intermediate layer does not comprise NiCr.

2. The coating blade according to claim 1, wherein the thermal conductivity of the intermediate layer is below 0.5 times that of the top deposit.

3. The coating blade according to claim 2, wherein the intermediate layer has a thickness within the range from 10 μm to 100 μm.

4. The coating blade according to claim 2, wherein the intermediate layer has a thickness of about 50% of that of the top deposit.

5. The coating blade according to claim 1, wherein the intermediate layer has a thickness within the range from 10 μm to 100 μm.

6. The coating blade according to claim 1, wherein the intermediate layer has a thickness of about 50% of that of the top deposit.

7. The coating blade according to claim 1, wherein the intermediate layer comprises an inner bond coat layer, a center ceramic oxide layer, and an outer bond coat layer; wherein the center ceramic oxide layer comprises a material selected from zirconia, titania or a mixture thereof.

8. The coating blade according to claim 7, wherein the center layer comprises stabilized zirconia.

9. The coating blade according to claim 7, wherein the intermediate layer comprises titania in a mixture with chromium (Cr).

10. The coating blade according to claim 1, wherein the intermediate layer comprises a material selected from ceramic materials, zirconia, titania, polymer materials, and any mixture thereof.

11. The coating blade according to claim 1, wherein the wear resistant top deposit comprises a metallic or carbide material.

12. The coating blade according to claim 1, wherein the wear resistant top deposit comprises a cermet.

13. The coating blade according to claim 1, wherein the wear resistant top deposit is selected from Ni and Co alloys; WC/Co, WC/CoCr or WC/Ni materials; CrC/NiCr materials; WC or CrC in a metallic binder; chromium plating; and chemically deposited NiP or NiB.

14. The coating blade of claim 1, wherein the conductivity of the intermediate layer is below 0.2 times that of the top deposit.

15. The coating blade according to claim 1, wherein the intermediate layer has a thickness within the range 20 μm to 80 μm.

* * * * *